(12) United States Patent
Lia et al.

(10) Patent No.: US 6,644,123 B1
(45) Date of Patent: Nov. 11, 2003

(54) LOW MASS POINTER ELEMENT FOR A PRESSURE MEASURING MECHANISM

(75) Inventors: Raymond A. Lia, Auburn, NY (US); Robert L. Vivenzio, Auburn, NY (US); James M. Baxter, Jordan, NY (US); Michael Kehoskie, Jordan, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 0 days.

(21) Appl. No.: 09/471,847

(22) Filed: Dec. 23, 1999

Related U.S. Application Data

(63) Continuation-in-part of application No. 09/226,786, filed on Jan. 7, 1999.

(51) Int. Cl.[7] ................................................. G01L 7/00
(52) U.S. Cl. ........................................... 73/700; 73/715
(58) Field of Search ........................... 73/715, 716–727

(56) References Cited

U.S. PATENT DOCUMENTS

| | | |
|---|---|---|
| 1,106,341 A | 8/1914 | Bristol |
| 1,328,876 A | 1/1920 | Hill |
| 1,377,032 A | 5/1921 | Starling et al. |
| 1,409,028 A * | 3/1922 | Richter .................... 73/715 |
| 2,087,494 A | 7/1937 | Annin |
| 2,564,669 A | 8/1951 | Brady |
| 2,636,394 A | 4/1953 | Melchior |
| 3,805,618 A | 4/1974 | Csaposs et al. |
| 3,874,242 A | 4/1975 | Csaposs et al. |
| 4,036,061 A | 7/1977 | Speidel |
| 4,040,298 A | 8/1977 | Lee et al. |
| 4,166,396 A * | 9/1979 | Baker ..................... 73/716 |
| 4,255,970 A | 3/1981 | Van Pottelberg |
| 4,300,396 A | 11/1981 | Buckshaw |
| 4,409,833 A * | 10/1983 | Thomson et al. ............ 73/716 |
| 4,433,579 A * | 2/1984 | Horn ..................... 73/716 |
| 4,552,153 A * | 11/1985 | Newman et al. ............ 73/715 |
| 4,580,950 A | 4/1986 | Sumikawa et al. |
| 4,667,069 A | 5/1987 | Cholkeri |
| 4,685,336 A | 8/1987 | Lee |
| 4,856,339 A | 8/1989 | Williams |
| 5,082,019 A | 1/1992 | Tetrault |
| 5,181,422 A | 1/1993 | Leonard et al. |
| 5,557,049 A * | 9/1996 | Ratner .................... 73/715 |
| 6,120,458 A * | 9/2000 | Lia et al. ................. 73/715 |

FOREIGN PATENT DOCUMENTS

| | | |
|---|---|---|
| JP | 5800279 | 5/1983 |
| JP | 1063625 | 3/1989 |
| JP | 607488 | 3/1994 |

* cited by examiner

*Primary Examiner*—Edward Lefkowitz
*Assistant Examiner*—Andre Allen
(74) *Attorney, Agent, or Firm*—Wall Marjama & Bilinski LLP

(57) ABSTRACT

A low-mass pointer element for a pressure measuring mechanism is made from a lightweight plastic paper material and includes a center hub having a through aperture which is sized to accommodate a rotatable shaft end of the pressure measuring mechanism. An indicating end of the pointer element is sloped downwardly toward a dial face relative to the center hub to prevent parallax along with a counterbalancing portion. The indicating end is inwardly tapered to a flattened distal end to provide equivalent stiffness, but with considerably less mass so as to significantly reduce stress loads on a corresponding movement mechanism.

30 Claims, 5 Drawing Sheets

LOW MASS POINTER ELEMENT FOR A PRESSURE MEASURING MECHANISM

CROSS REFERENCE TO RELATED APPLICATIONS

This application is a continuation in part of U.S. Ser. No. 09/226,786, filed Jan. 7, 1999, and entitled: Low Profile Pressure Measuring Device.

FIELD OF THE INVENTION

This invention relates to the field of dial indicators, and in particular to a low mass needle used for a pressure indicating mechanism.

BACKGROUND OF THE INVENTION

Pressure measuring devices, such as for sphygmomanometers used for measuring blood pressure, include a pneumatic bulb which inflates a pressure chamber of an attached sleeve that is fitted over the arm or leg of patient. A diaphragm or bellows assembly, responsive to changes in fluid pressure of the pneumatic bulb and the sleeve pressure chamber, is positioned in a dial indicator housing. The pointer of a dial indicator is interconnected to a bellows assembly by a movement mechanism, whereby inflation of the bellows causes corresponding circumferential movement of the pointer.

Traditionally, brass, steel, or aluminum have been the preferred materials for pointers of the above-type devices. Conventional pointer elements, however, exhibit an undesirable level of instability during use, borne from the mass of the pointer, which creates a stress load on the measuring mechanism, and degrades the overall accuracy and responsiveness of the device. For example, a conventional brass pointer is approximately 0.008 inches thick. A plastic pointer having an equivalent stiffness would therefore have to be approximately three times as thick as the brass pointer design, ordinarily negating a low mass design. As a result of the above load and instability, frequent calibration is also required to properly null the device which leads to a reduction in the useful life of the mechanism.

Consequently, there are preexisting needs in the field to provide a low mass pointer element for use in a pressure measuring mechanism which can be manufactured and assembled with reduced costs than those which are previously known.

SUMMARY OF THE INVENTION

It is a primary object of the present invention to improve the state of the art of dial indicators.

It is a further primary object to be able to improve the useful life of a dial pressure or other indicator mechanism.

It is yet another primary object of the present invention to improve the repeatability of a pressure indicating mechanism.

Therefore and according to a preferred aspect of the present invention, there is provided in a pressure measuring mechanism having a dial face gauge, a low mass pointer element comprising:

a center hub capable of being fitted onto an extending axial shaft of said measuring mechanism, the center hub having a recess for receiving a locking member of said axial shaft, an indicator portion extending from said center hub, and a counterbalance portion. The counterbalance portion oppositely extends from the center hub, in which the indicator portion being inwardly tapered to a blade-like end and in which said pointer element is formed form a lightweight material.

The center hub of the pointer element can also include a through aperture for receiving a protruding end of the axial shaft with the locking member extending integrally as well from the shaft end.

According to another preferred aspect of the present invention, there is provided a movement mechanism comprising an axial shaft member having opposing first and second ends, axial displacement means for moving the first end of said shaft member in an axial direction, and at least one spring member coaxially positioned relative to said shaft member axis. The spring member is attached at one end to an intermediate portion of said shaft member and attached at an opposite end to a support, wherein the displacement means causes said shaft member to translate in said axial direction, said spring member to flex, and said shaft member to rotate. The movement mechanism further includes a dial face having measuring indicia fitted around the first end of said axial shaft member and a low mass pointer element fitted onto the first end of said axial shaft member, the low mass pointer element capable of circumferential movement relative to the dial face.

A distinct advantage of the present invention is that by making a plastic pointer with a tapered triangular configuration as preferably described equivalent stiffness to that of a metal pointer can be realized, but with significant mass reductions creating a considerable reduction in load to the movement mechanism while actually improving overall performance.

An advantage of the present invention is that a low mass needle as described herein has a significantly lower mass than any others previously known in the field due largely to the tapered cross section which adds significantly to the overall fatigue life of the gauge and measuring mechanism used in conjunction with the pointer.

Yet another advantage of the present invention is that the described pointer element can be repeatably aligned with the axial shaft member of the movement mechanism, thereby aiding in the manufacture and the calibration of a measuring device.

These and other objects, features, and advantages will become apparent from the following Detailed Description which should be read in conjunction with the accompanying drawings.

DETAILED DESCRIPTION

The present invention is herein described with reference to certain embodiments which are used in conjunction with a blood pressure measuring apparatus. It should be evident, however, to one of sufficient skill in the field that other variations and modifications can be made utilizing the inventive concepts described herein, as well as alternate applications other than blood pressure measurement, including barometers, pressure vessel indicators, pressure sensitive switches, valves, and literally any device requiring a pressure responsive element. Furthermore and throughout the course of the following discussion, terms such as "upwardly", "downwardly", "upper", "lower", "top", "bottom" and the like are used to provide a frame of reference with regard to the accompanying figures. These terms, however, should not be treated as limiting with regard to the invention as herein described.

Figure 1:
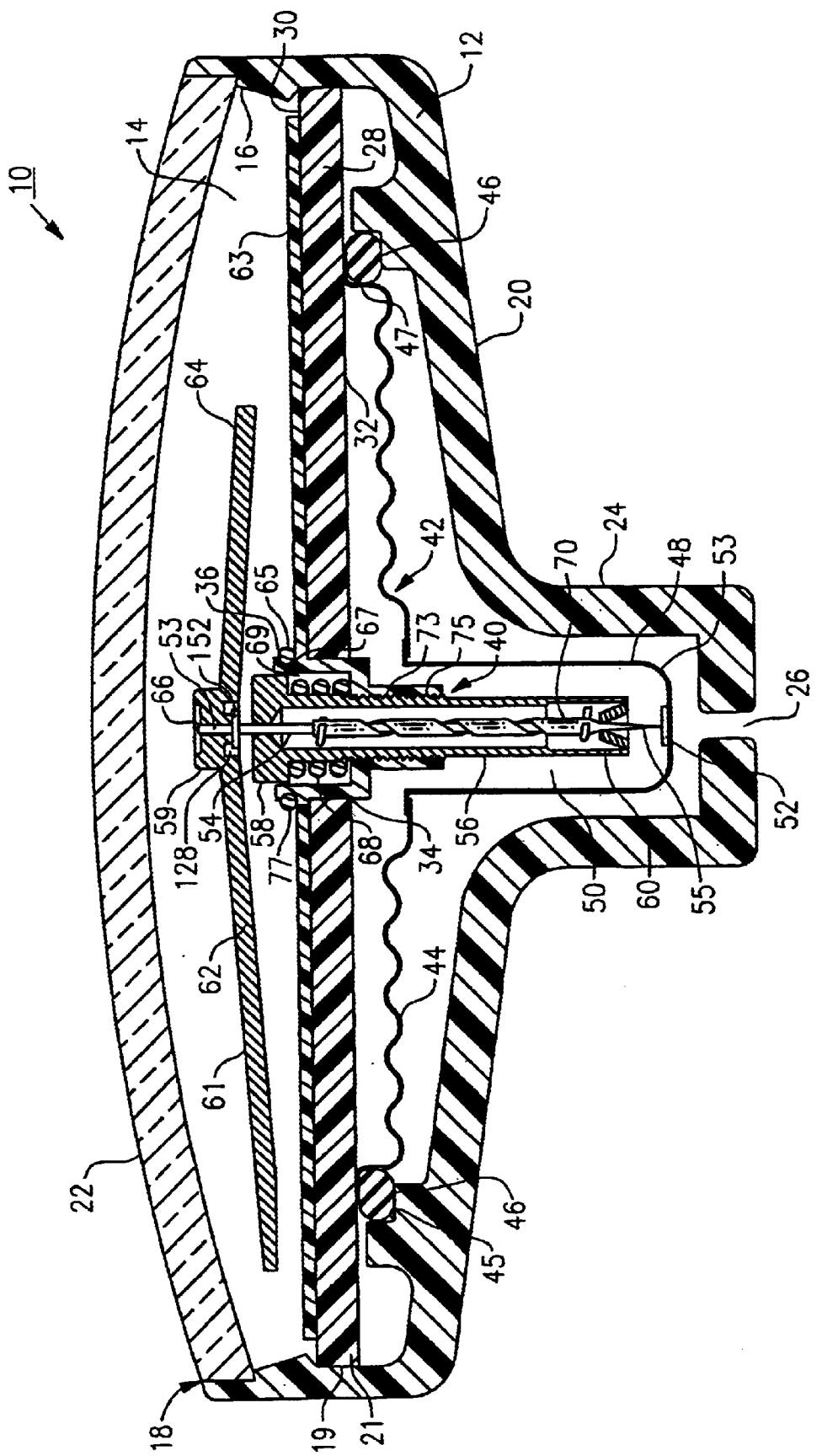
FIG. 1 is a sectional view of a pressure measuring device having a pointer element according to a first embodiment of the present invention.

Referring to FIG. 1, there is shown a pressure measuring device 10 including a substantially cylindrical housing 12 having an interior cavity 14 defined by a circumferential inner wall 16, an open top end 18, and a bottom end 20. A window or bubble 22, made from glass or any convenient transparent material, is attached in a known manner to the open top end 18 of the housing 12. The bottom end 20 of the housing 12 has a diameter which inwardly tapers down to a narrow downwardly extending portion 24 having a bottom opening 26 serving as a port for admitting a fluid, as described in greater detail below. Preferably, the diameter of the narrow extending portion 24 is about one third that of the major portion of the housing, though it will be apparent from the following discussion that this parameter can be suitably varied.

The interior cavity 14 of the housing 12 is sized for retaining a number of component parts, including a support plate 28. The support plate 28 is a generally planar member having opposing top and bottom facing sides 30, 32, as well as a central through opening 34. A press fitted sleeve 36 attached to the top facing side 30 of the support plate 28 extends into the central through opening 34 and is used for retaining a movement mechanism 40, which is described in greater detail below. The circumferential inner wall 16 further includes a reflexed portion 19 which is sized for supporting an outer edge 21 of the support plate 18 immediately therebeneath and at a predetermined height within the housing 12. The central through opening 34 is shown as being substantially aligned with the bottom opening 26 according to this embodiment, but this alignment is not essential.

A diaphragm sub-assembly 42 includes a flexible diaphragm 44 which is non-fixedly attached to the bottom facing side 32 of the support plate 28. The diaphragm 44 is largely horizontally planar and includes a plurality of wave-like surfaces 49. The outer edge 47 of the diaphragm 44 is clamped thereto by an O-ring 46 disposed on a circumferential ledge 45 extending upwardly from the bottom end 20 of the housing 12. The O-ring 46 not only supports the diaphragm 44 in place, but also provides a seal, the function of which is described in greater detail below. The centermost portion of the horizontally planar diaphragm 44 is cut or otherwise removed and replaced with a continuous downwardly extending section, hereinafter referred to as the pan 48, which is soldered or otherwise fixed to or integral with the remainder of the diaphragm. The pan 48 is a hollow cylindrical section which extends into the downwardly extending portion 24 of the housing 12 and having a cavity 50 which has a width dimension that is approximately equal to that of the press-fitted sleeve 36. A lower end 53 of the pan 48 includes a hardened or jeweled contact surface 52 on the interior thereof.

The movement mechanism 40 includes an axially displaceable shaft member 54 which is wholly enclosed within a tubular member 56 with the exception of protruding top and bottom ends 53, 55, respectively. A thin flexible ribbon-like spring section 70 is fixedly attached at one end 61 adjacent the bottom end of the tubular member 56 and at an opposite remaining end 59 to the axially displaceable shaft member 54 around which the ribbon spring 70 is helically or spirally wound. The outer tubular member 56 includes a set of external threads 73 extending over an upper portion of the length thereof which engage corresponding internal threads 75 provided in the press-fitted sleeve 36. The ribbon-like section 70 is manufactured from beryllium copper, spring steel, or other similar material.

The hollow tubular member 56 includes an integral top cap portion 58 having a diameter which is larger than the remainder of the member, the cap portion having a shoulder 57 which bears against a biasing spring 68 disposed within an annular recess 69 of the press-fitted sleeve 36. The top cap portion 58 and the biasing spring 68 are used to adjust the overall sensitivity of the movement mechanism 40.

When correctly positioned, the majority of the movement mechanism 40 extends beneath the support plate 28 and into the cavity 50 defined in the pan 48 which is already positioned in the downwardly extending portion 24 of the housing 12. In this position, the bottom end 55 of the shaft member 54 is proximate the contact surface 52.

Figure 6:
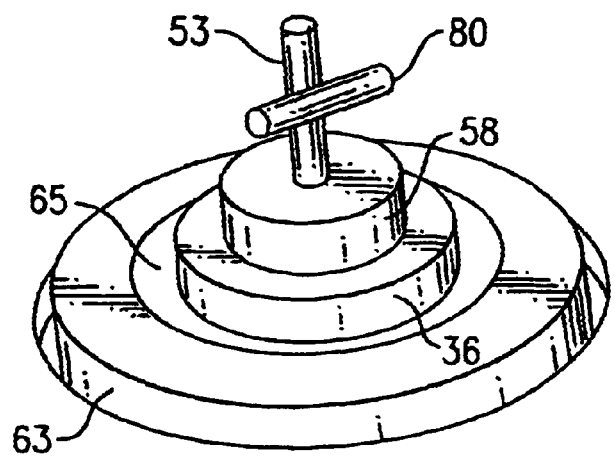
FIG. 6 is an enlarged partial view of the top portion of the pressure measuring mechanism of FIG. 5.

A dial face 63 having measuring indicia, 76, FIG. 6, is attached to the top facing side 30 of the support plate 28 through a center opening which is sized to fit over the press fitted sleeve 36. An elastomeric O-ring 65 disposed in a slot 67 of the sleeve 36 engages an inner edge of the dial face 63.

A pointer element 62 in accordance with a first embodiment of the present invention is mounted to the protruding top end 53 of the shaft member 54. The pointer element 62 is made from a light-weight plastic material and includes a center hub 59 having a through aperture 66 for receiving the shaft's protruding top end 53, as well as a bottom-sided recess 71 which accommodates a locking member 80 of the shaft member 54. The locking member 80, as best shown in FIG. 6, is substantially horizontal; that is orthogonal to the vertically disposed axis of the shaft member 54. In addition, the pointer element includes an indicating portion 61 and a counterbalancing portion 64. each oppositely and axially disposed relative to the central hub 59. Preferably, each of the indicating and counterbalancing portions 61,64 are inwardly angled from the center hub 59 toward the dial face 63 and having a geometry which provides light weight attributes which aid in the life of the overall movement mechanism, especially the ribbon-like spring section 70. This geometry is further discussed below in greater detail.

To conclude the background of the device of FIG. 1, and in operation, a change in the pressure of incoming fluid (in this example, air) enters the bottom opening 26 of the housing 12 and more particularly the interior cavity of the housing 12. The seal provided onto the outer edge 47 of the diaphragm 44 by the O-ring 46 clamping against the bottom facing side 32 of the support plate 28 prevents air from further penetrating the interior cavity 14. Therefore, the increase in pressure causes axial movement of the pan 48 and the interior contact surface 52 pushes upwardly against the bottom end 55 of the axially displaceable shaft member 54. As a result, the ribbon spring 70 extends against the fixed end 60 of the tubular member 56, causing the shaft member 54 to rotate. The rotation of the shaft member 54 causes a corresponding circumferential movement of the pointer element 62 attached to the top end 53 of the shaft member 54 relative to indicia (not shown) provided on the dial face 63. Due to the relatively low mass of the pointer element 62, there is less instability in the movement thereof.

Figure 2:
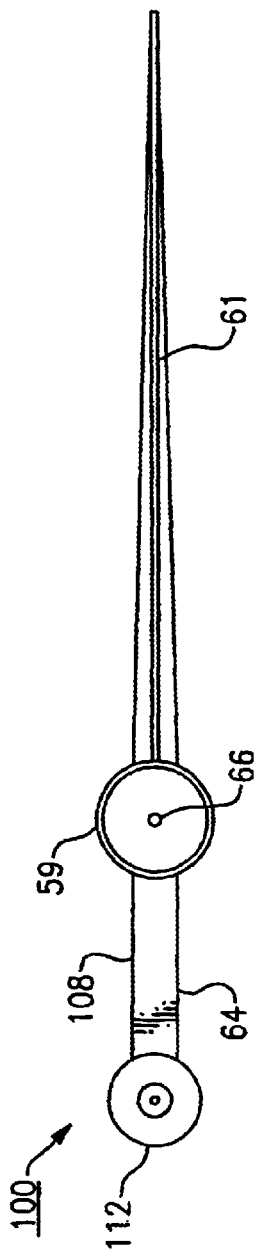
FIG. 2 is a top view of a pointer element made in accordance with a second embodiment of the present invention.
Figure 3:
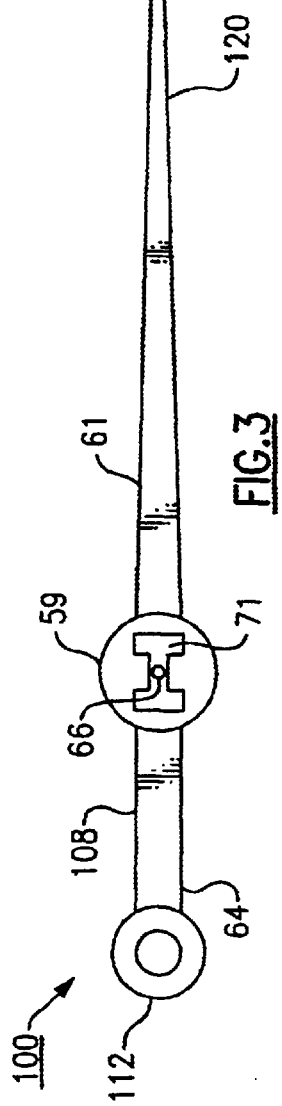
FIG. 3 is a bottom view of the pointer element of FIG. 2.
Figure 4:
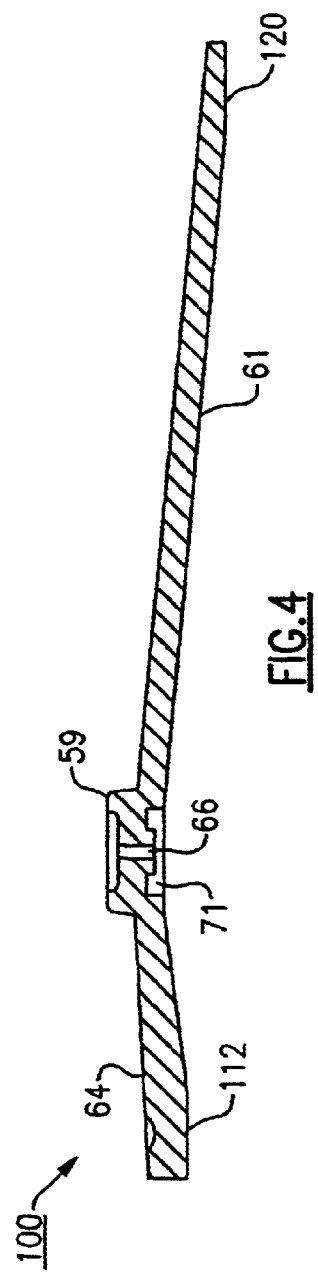
FIG. 4 is a sectional view of the pointer element of FIGS. 2 and 3.

Referring now to FIGS. 2–4, a pointer element similar to that shown in FIG. 1, and made in accordance with a second embodiment of the invention includes a center hub 59 with a circular through aperture 66 located substantially in the center thereof. For the sake of clarity, similar parts are herein identified with the same reference numerals. The circular aperture 66 is capable of being fitted onto the projecting top end 53 of the axial shaft 54, FIG. 1, upwardly extending through the dial face 63, FIG. 1. An indicator portion 61 extending from the center hub 59 includes a distal indicating end 104. The indicator portion 61 tapers inwardly from the center hub 53 relative to the axis of the indicator portion 61.

A counterbalancing portion 64 extends from the center hub 59 oppositely from the axial indicator portion 61. According to the described embodiment, the counterbalancing portion 64 includes an elongate section 108 terminating at a rounded proximal end 112. However, it should be readily apparent to one skilled in the art that the counterbalancing portion 64 may take the form of other configurations; for example, a triangle, square, or any other suitable shape can be similarly devised. The bottom surface of the center hub 59 includes an axial recess 71 defining a key-way which enables the pointer element 100 to snap onto the locking member 80, FIG. 1, of the shaft member 54.

The axial indicator portion 61 and the counterbalancing portion 64 each slope downwardly relative to the center hub 59 with the axial indicator portion including a flattened or blade-like distal end 120.

Figure 5:
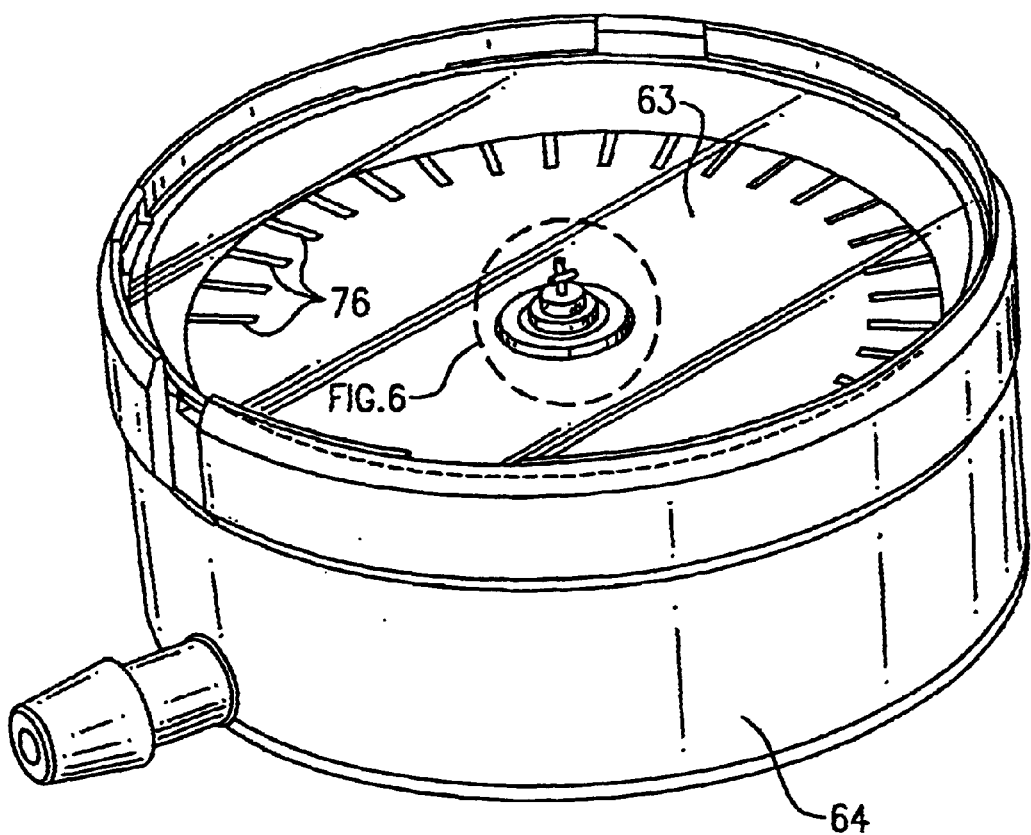
FIG. 5 is a top perspective view of a pressure measuring device.

Referring now to FIGS. 5 and 6, the top end 53 of the shaft member 54 includes the horizontal locking member 80 which is substantially orthogonal to the axis of the shaft member 54. The horizontal locking member 80 fits securely within the recess 71 on the underside of the center hub 59, while the top of the axial shaft member 54 extends through the circular aperture 66 of the center hub 59, thereby providing a secure fit for the pointer element 100.

Calibration of the above assembly is a relatively simple procedure, as compared with previously known devices. Referring to FIGS. 1, 5, and 6, the bubble 22, FIG. 1, is removed from the open top end 17 of the housing 64. The engagement of the O-ring 65 against the inner edge of the dial face 63 permits free rotation in relation to the fixed pointer element 100. Sensitivity adjustments for the ribbon spring 70 can also be made at the top of the assembly by rotating the top cap portion 58 against the biasing spring 58 within the recess 69 of the press fitted sleeve 36, so as to adjust the sensitivity of the ribbon spring 70 for a given rotation. This procedure is described in U.S. Ser. No. 08/972, 583 and U.S. Ser. No. 09/172,552, the entire contents of which have previously been incorporated by reference.

In the meantime, the above pointer element 100 having the above described configuration, primarily the triangular (inwardly tapered) indicator section 61, achieves an equivalent stiffness to that of a metal pointer element. For example, a plastic pointer counterpart using the present design for a corresponding brass pointer (not shown) having a thickness of approximately 0.008 inches would have approximately three times the thickness (about 0.030 inches) and about twice the volume, but due to the tapered configuration, the present pointer element 100 has about 25 percent of the mass of the metal pointer. This design therefore can improve the function of any traditional gauge, including the present movement mechanism, by reducing pointer instability or bounce, better accuracy, and increased wear life. In addition, the movement mechanism will have greater impact resistance due to the reduced mass of the pointer element.

Figure 7:
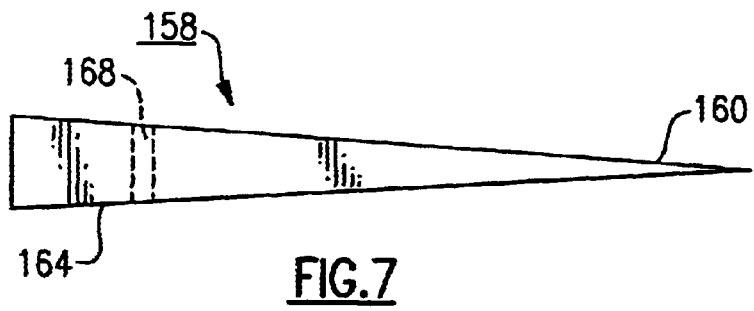
FIG. 7 is a side view of a pointer element made in accordance with a third embodiment of the present invention.
Figure 8:
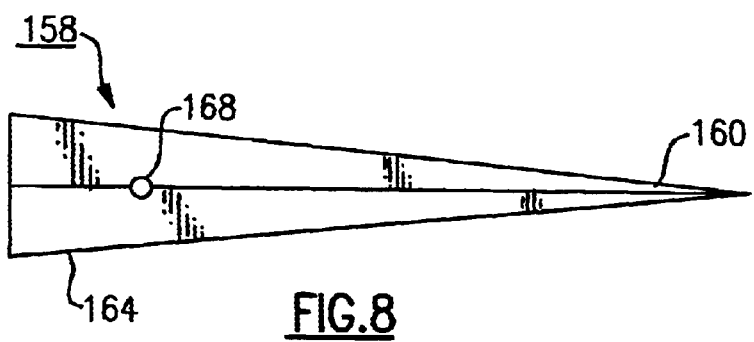
FIG. 8 is a top view of the pointer element of FIG. 7.

Referring now to FIGS. 7 and 8, a low mass pointer element 124 made in accordance with a third embodiment is constructed from paper, and, similarly includes a respective indicating portion 128 and a counterbalancing portion 132. An aperture 136 enables the pointer element 124 to be fitted onto the shaft member 54 of the pressure measuring mechanism, such as the mechanism previously described. The aperture 136 is located such that the pointer element 124 is balanced when fitted upon the shaft member 54 with the indicating portion 128 being inwardly tapered relative to a primary axis 138 to provide a desired low mass configuration.

Figure 9:
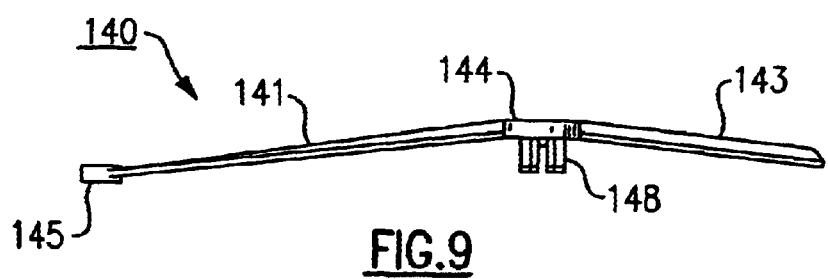
FIG. 9 is a side elevational view of a pointer element made in accordance with a fourth embodiment of the invention.
Figure 10:
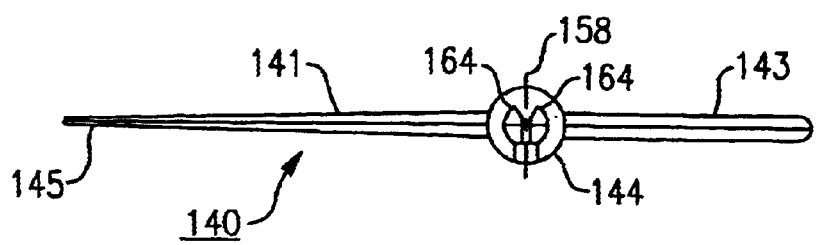
FIG. 10 is a top view of the pointer element of FIG. 9.
Figure 11:
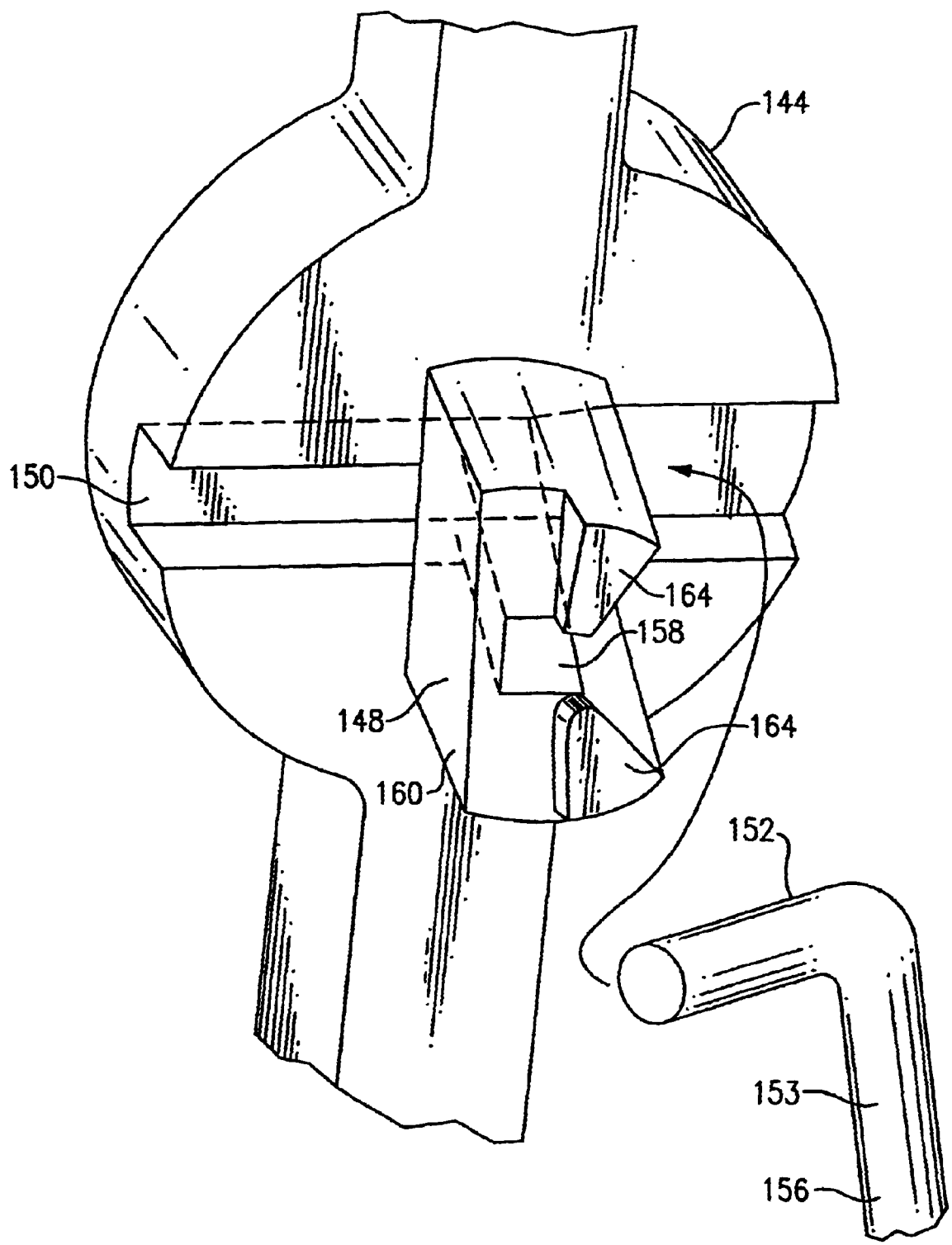
FIG. 11 is a bottom view of the pointer element of FIG. 10 in relation to a locking member of an axial shaft of a movement mechanism to which the pointer element is attached.

It should be noted that the pointer element can be attached to the above movement mechanism by means other than using a through aperture. For example, and according to FIGS. 9-11, a pointer element 140 made in accordance with a fourth embodiment of the invention includes a center hub 144 which includes a bottom attachment portion 148 having a horizontal slotted area 150 for receiving the top end 152 of an axial shaft member 156 (partially shown) for a movement mechanism (not shown) as previously described. The pointer element 140 as described herein is preferably an injection molded plastic component having an indicating portion 141 and a counterbalancing portion 143 oppositely disposed relative to the center hub 144. The indicating portion 141 and the counterbalancing portion 143 are each sloped downwardly relative to the center hub 144. According to this embodiment, each portion 141, 143 is sloped approximately 5–7°, though it should be readily apparent that this parameter can be suitably varied. The indicating portion 141 inwardly tapers from the center hub to a flattened distal end 145, the distal end being a blade-like section with a width dimension which is orthogonal with respect to the width dimension of the pointer element 140. The flattened distal end 145 coupled with the downward slope of the indicating portion 141 effectively reduces parallax with respect to indicia provided on a dial face (not shown). In the meantime, the counterbalancing portion 143 is an elongate portion which balances the weight of the indicating portion 141 and as previously described can assume other configurations for this purpose.

According to this embodiment, the very top end 152 of the axial shaft member 156 as opposed to those previously described is bent horizontally in substantially a 90 degree configuration. The bent end is accepted within the horizontal slotted area 150 of the attachment portion 148 with the axial portion 153 of the top end 152 of the shaft member 156 being retained in a vertical recess 158 defined in a supporting block 160. The vertical recess 158 defines a vertical slot, including a pair of inclined receiving ends 164, which permit snap-fitting of the shaft member 156 to effectively retain the pointer element 140.

PARTS LIST FOR FIGS. 1–11

10 pressure measuring device
12 housing
14 interior cavity
16 circumferential inner wall
18 open top end
19 reflexed portion 20 bottom wall
21 outer edge -support plate
22 bubble
24 downwardly extending portion
26 bottom opening
28 support plate
30 top facing side
32 bottom facing side
34 central through opening
36 sleeve
40 movement mechanism
42 diaphragm subassembly
44 diaphragm
45 circumferential ledge
46 O-ring
47 outer edge
48 pan
50 cavity
52 contact surface
53 top end
54 shaft member
55 bottom end
56 tubular member
58 top cap portion
59 center hub
60 bottom end
61 indicator portion
62 pointer element
63 dial face
64 counterbalancing portion
65 O-ring
66 circular through aperture
67 slot
68 biasing spring
69 recess
70 ribbon spring
71 recess
73 threads
75 threads
76 measuring indicia
80 locking member
100 pointer element
104 distal indicating end
108 elongate section
112 rounded proximal end
116 axial recess
120 flattened end
124 low mass pointer element
128 indicating portion
132 counterbalancing portion
136 aperture
138 primary axis
140 pointer element
141 indicating portion
143 counterbalancing portion
144 center hub
145 flattened distal end
148 bottom attachment portion
150 slotted area
152 top end
153 axial portion
156 axial shaft member
158 vertical recess
160 supporting block
164 receiving ends It will be readily apparent to those of ordinary skill in the field that other variations and modifications are possible within the spirit and scope of the invention as defined by the following appended claims.

We claim:

1. A pressure measuring mechanism comprising:
   an axially extending shaft member having a first end and a locking member disposed in proximity to said first end;
   a dial face disposed in relation to the first end of said axially extending shaft member; and
   a pointer element adapted for rotary movement with respect to said dial face, said pointer element comprising:
      a center hub having a recess for receiving the locking member of said axial shaft;
      an indicator portion extending from said center hub; and
      a counterbalance portion for counterbalancing said indicator portion, said counterbalance portion oppositely extending from said center hub, said indicator portion being inwardly tapered to a blade end, and in which said pointer element is formed from a lightweight material.

2. The pointer element as recited in claim 1, wherein said indicator portion slopes downwardly relative to said center hub toward said dial face.

3. The pointer element as recited in claim 2 wherein said counterbalance portion is angled downwardly relative to said center hub.

4. The pointer element as recited in claim 1, wherein said pointer element is made from a moldable plastic.

5. The pointer element as recited in claim 1, wherein said pointer element has a mass which is less than one half of the mass of a metal pointer element having an equivalent stiffness.

6. The pointer element as recited in claim 3, wherein said counterbalance portion includes an elongate portion extending to a rounded proximal end.

7. The pointer element as recited in claim 6, wherein said proximal end of said counterbalance portion is substantially parallel to the dial face of the pressure measuring mechanism.

8. The pointer element as recited in claim 1 wherein said center hub includes at least one slot for receiving said locking member.

9. The pointer element as recited in claim 1, wherein said center hub includes a through aperture for receiving the first end of said shaft member.

10. A movement mechanism for a measuring device, said movement mechanism comprising:
    an axially movable shaft member having opposing first and second ends;
    axial displacement means for moving the first end of said shaft member in an axial direction;
    a fixed support;
    at least one spring member coaxially positioned relative to said shaft member axis and helically wound about said axially movable shaft member, said helically wound spring member being attached at one end to an intermediate portion of said shaft member and attached at an opposite end to said fixed support, wherein said displacement means acts directly on said shaft member to cause it to translate in said axial direction, said helically wound spring member to flex, and said axially movable shaft member to rotate, said helically wound spring further supplying a restoring force to return said shaft member to an initial position when said axial displacement means stops moving the first end of said axially movable shaft member;

a dial face having measuring indicia fitted around the first end of said axially movable shaft member; and;

a low mass pointer element fitted onto the first end of said axially movable shaft member, said pointer element being capable of circumferential movement relative to the indicia of said dial face.

11. A movement mechanism as recited in claim 10, wherein said shaft member includes a locking member and wherein said pointer element includes:

a center hub capable of being fitted onto a first end of said axially movable shaft member, said center hub including a recess for receiving the locking member of said shaft member;

an axial indicator portion extending from said center hub; and a counterbalance portion for counterbalancing said indicator portion, said counterbalance portion oppositely extending from said center hub.

12. The movement mechanism as recited in claim 11, wherein said locking member of said axially movable shaft member extends orthogonally relative to a primary shaft axis.

13. The movement mechanism as recited in claim 11, wherein said movement mechanism includes first calibration means for calibrating said at least one spring member.

14. The movement mechanism as recited in claim 13, wherein said first calibration means is located at the first end of said axially movable shaft member.

15. The movement mechanism as recited in claim 14, wherein said first calibration means is accessible without removal of said low-mass pointer element.

16. The movement mechanism as recited in claim 11, wherein said movement mechanism includes second calibration means for calibrating the circumferential position of the pointer element relative to the dial face.

17. The movement mechanism as recited in claim 16, wherein said second calibration means is located at the first end of said axially movable shaft member.

18. The movement mechanism as recited in claim 17, wherein said second calibration means is accessible without removal of said pointer element.

19. The movement mechanism as recited in claim 11, wherein said axial indicator portion and said counterbalance portion are each angled downwardly relative to said center hub.

20. The movement mechanism as recited in claim 19, wherein the axial indicator portion tapers inwardly relative to a primary axis of the pointer element.

21. The movement mechanism as recited in claim 20, wherein the indicating end of said axial indicator portion is flattened relative to the taper of said indicator portion.

22. The movement mechanism as recited in claim 10, wherein said pointer element is made from a molded plastic.

23. The movement mechanism as recited in claim 10, wherein said pointer element is made from paper.

24. The movement mechanism as recited in claim 19, wherein said counterbalance portion includes an elongate portion extending to a rounded proximal end.

25. The movement mechanism as recited in claim 24, wherein the rounded end of said counterbalance portion is substantially parallel to the dial face.

26. The movement mechanism as recited in claim 11, wherein said pointer element has a mass which is less than one half of the mass of a metal pointer element having an equivalent stiffness.

27. The movement mechanism as recited in claim 11, wherein said locking member of said axial shaft member extends orthogonally relative to a primary shaft axis, said pointer element having a recess sized to receive said locking member.

28. The pointer element as recited in claim 1, wherein said hub is integrally formed with said indicator portion.

29. The pointer element as recited in claim 1, wherein said hub is integrally formed with said counterbalance portion.

30. The movement mechanism as recited in claim 11, wherein said hub is integrally formed with said indicator portion.

* * * * *